(12) United States Patent
Vihtari

(10) Patent No.: US 9,094,455 B2
(45) Date of Patent: Jul. 28, 2015

(54) DIAMETER PROTOCOL VERSION SPANS

(75) Inventor: Mike Vihtari, Kanata (CA)

(73) Assignee: Alcatel Lucent, Boulogne-Billancourt (FR)

( * ) Notice: Subject to any disclaimer, the term of this patent is extended or adjusted under 35 U.S.C. 154(b) by 93 days.

(21) Appl. No.: 13/614,179

(22) Filed: Sep. 13, 2012

(65) Prior Publication Data

US 2014/0071890 A1   Mar. 13, 2014

(51) Int. Cl.
  *H04W 4/00*   (2009.01)
  *H04J 3/16*   (2006.01)
  *H04J 3/22*   (2006.01)
  *H04L 29/06*   (2006.01)
  *H04L 29/08*   (2006.01)

(52) U.S. Cl.
  CPC ............... *H04L 69/18* (2013.01); *H04L 67/34* (2013.01)

(58) Field of Classification Search
  None
  See application file for complete search history.

(56) References Cited

U.S. PATENT DOCUMENTS

| | | | | |
|---|---|---|---|---|
| 7,466,659 B1* | 12/2008 | Kazar et al. | ............ | 370/252 |
| 2005/0204282 A1* | 9/2005 | Harutunian et al. | ........... | 715/513 |
| 2006/0282545 A1* | 12/2006 | Arwe et al. | ............ | 709/237 |
| 2007/0153995 A1* | 7/2007 | Fang et al. | ............ | 379/114.03 |
| 2008/0229385 A1* | 9/2008 | Feder et al. | ........... | 726/1 |
| 2008/0250146 A1* | 10/2008 | Arwe et al. | ............ | 709/227 |
| 2011/0126277 A1* | 5/2011 | McCann et al. | ........... | 726/13 |
| 2011/0200047 A1* | 8/2011 | McCann et al. | ........... | 370/392 |
| 2011/0212733 A1* | 9/2011 | Edge et al. | ........... | 455/456.1 |
| 2012/0155389 A1* | 6/2012 | McNamee et al. | ........... | 370/328 |
| 2012/0158994 A1* | 6/2012 | McNamee et al. | ........... | 709/238 |
| 2012/0158995 A1* | 6/2012 | McNamee et al. | ........... | 709/238 |
| 2012/0210006 A1* | 8/2012 | Vihtari | ............ | 709/227 |
| 2012/0269167 A1* | 10/2012 | Velev et al. | ............ | 370/331 |
| 2013/0212265 A1* | 8/2013 | Rubio Vidales et al. | ........ | 709/224 |
| 2013/0235736 A1* | 9/2013 | Khadri et al. | ............ | 370/250 |
| 2014/0161046 A1* | 6/2014 | Edge et al. | ............ | 370/328 |

OTHER PUBLICATIONS

U.S. Appl. No. 13/436,321 for Diameter Versioning Dictionary, filed Mar. 30, 2012.
U.S. Appl. No. 13/434,046 for Multiple Major Version Signaling on Session Initiation, filed Mar. 29, 2012.
Calhoun, Loughney, Guttman, Zorn, Arkko, Diameter Base Protocol, RFC 3588, Sep. 23, p. 1-131.
3GPP TS 29.215 v10.4.0 (Dec. 2011), 3rd Generation Partnership Project; Technical Specification Group Core Network and Terminals; Policy and Charging Control (PCC) over S9 reference point; Stage 3 (Release 10).
3GPP TS 29.214 v10.5.0 (Dec. 2011) 3rd Generation Partnership Project; Technical Specification Group Core Network and Terminals; Policy and Charging Control over Rx reference point. (Release 10).
3GPP TS 29.212 v10.5.0 (Dec. 2011) 3rd Generation Partnership Project; Technical Specification Group Core Network and Terminals; Policy and Charging Control (PCC) over Gx reference point (Release 10).

* cited by examiner

*Primary Examiner* — Gregory Sefcheck
*Assistant Examiner* — Suk Jin Kang
(74) *Attorney, Agent, or Firm* — Kramer & Amado, P.C.

(57) ABSTRACT

Embodiments of the invention provide a method and apparatus for managing feature support requirements for a communication protocol with major-minor version spans having temporal constraints on feature definitions using a flexible Diameter command dictionary wherein context-specific definitions are defined to apply to different versions and releases.

15 Claims, 3 Drawing Sheets

| Diameter Versioning Dictionary 200 | | | |
|---|---|---|---|
| AVP | Definition(s) | | |
| AVP 1 | Default Definition A1 | Context-specific Definitions | |
| | | Context 1 | Definition A1-1 |
| AVP 2 | Default Definition A2 | | |
| AVP 3 | Default Definition A3 | Context-specific Definitions | |
| | | Context 1 | Definition A3-1 |
| | | Context 2 | Definition A3-2 |
| | | Context 4 | Definition A3-4 |
| AVP N | Default Definition AN | Context-specific Definitions | |
| | | Context M | Definition AN-M |
| Commands | Definition(s) | | |
| Command 1 | Default Definition C1 | | |
| Command 2 | Default | Context-specific Definitions | |
| | | Context 1 | Definition C2-1 |

FIG. 2

DIAMETER PROTOCOL VERSION SPANS

FIELD OF THE DISCLOSURE

Disclosures made herein relate generally to the telecommunications industry. The invention discussed herein is in the general classification of a device capable of operation in a mode compatible with different versions of the 3GPP standards and a method for operating according to different versions of the 3GPP standards at a Policy and Charging Rules Function (PCRF) node.

BACKGROUND

This section introduces aspects that may be helpful in facilitating a better understanding of the invention. Accordingly, the statements of this section are to be read in this light and are not to be understood as admissions about what is in the prior art or what is not in the prior art.

The 3rd Generation Partnership Project (3GPP) attempts to create a uniform third-generation mobile phone system. 3GPP standards are called releases and different functionality is present in the different versions of the releases. The 3GPP standards continue to evolve and the major releases of the standards can be differentiated using supported features. However, there also may be differences between minor versions of the 3GPP standards that render them incompatible with each other. In addition, different vendors might implement major versions at different stages or at different time resulting in different implementations of a particular major version which can lead to compatibility issues when interacting with network nodes from different vendors.

Diameter is a computer networking protocol for AAA (Authentication, Authorization and Accounting) defined in Internet Engineering Task Force (IETF) RFC 3588, which is hereby incorporated by reference. 3GPP Network nodes communicate using Diameter commands and to maintain extensibility, typically use a Diameter command dictionary to provide the format of commands and Attribute Value Pairs (AVPs). Definitions of Diameter commands, their associated AVPs, and whether an AVP is optional or mandatory are expected to be static but unfortunately can vary with different versions. Incompatibility issues between different network nodes running different versions of a major release can include not only different definitions of an AVP but also the behavior or implementation of various commands. A traditional Diameter command dictionary implementation is limited in how it can address these issues. There is a need for a system for handling Diameter commands with improved flexibility.

SUMMARY OF THE DISCLOSURE

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method of managing version spans for a communication protocol, performed by a network node. The method comprises steps of: determining identification of a current version of a communication protocol associated with a communication session; retrieving version spans for the current version from a protocol versioning dictionary at the network node; and determining if an attribute definition exists having a version span matching the current version and if so, determining if the current version satisfies the time constraints of the version span and if so applying the associated attribute definition.

Various embodiments are described wherein determining identification of the current version of a communication protocol comprises determining a major version and a minor version of the communication protocol.

Various embodiments are described said communication protocol comprises a Diameter protocol and wherein determining the minor version comprises accessing provisioned information on the network node associated with a Diameter identity associated with the session.

Various embodiments are described wherein if no attribute definition exists having a version span matching the current version, then determining if an older version applies and if so applying the associated attribute definition.

Various embodiments are described wherein determining if an older version applies comprises applying the associated attribute definition only if the version span for the older version has no end delimiter.

Various embodiments are described wherein if no attribute definition exists having a version span matching the current version, then determining if a newer version applies and if so applying the associated attribute definition.

Various embodiments are described wherein determining if a newer version applies comprises applying the associated attribute definition only if the version span for the newer version has no start delimiter.

Various exemplary embodiments relate to a network node configured to manage version spans for a communication protocol. The network node comprises: an interface for communicating with an entity operable to send and receive messages regarding a session; data storage adapted to store session data related to the session and to store configuration data corresponding to the entity; and a controller operable to: determine identification of a current version of a communication protocol associated with a communication session; retrieve version spans for the current version from a protocol versioning dictionary at the network node; and determine if an attribute definition exists having a version span matching the current version and if so, determining if the current version satisfies the time constraints of the version span and if so applying the associated attribute definition.

Various exemplary embodiments relate to a tangible and non-transitory machine-readable storage medium encoded with instructions for execution by a network node. The tangible and non-transitory machine-readable storage medium comprises: instructions for determining identification of a current version of a communication protocol associated with a communication session; instructions for retrieving version spans for the current version from a protocol versioning dictionary at the network node; instructions for determining if an attribute definition exists having a version span matching the current version and if so, determining if the current version satisfies the time constraints of the version span and if so applying the associated attribute definition.

BRIEF DESCRIPTION OF THE DRAWINGS

Some embodiments of apparatus and/or methods in accordance with embodiments of the present invention are now described, by way of example only, and with reference to the accompanying drawings in which:

FIG. 2 illustrates a data structure according to an embodiment; and

In the figures, like features are denoted by like reference characters.

DETAILED DESCRIPTION

Diameter commands contain AVPs related to various features introduced at different times during the life of the 3GPP standard. Additionally some features can be "back-ported" to a new minor release of a previous major release, which means future minor releases of that previous major release must also support the feature. For example four new features could be introduced in 3GPP Release 9 in Q1 2012. One of those features could be back-ported to 3GPP Release 8.3 which is also introduced at the same time in Q1 2012. However, support of the back-ported feature would not be required for minor versions of 3GPP release 8 that were introduced before Q1 2012 (e.g.: Release 8.1 or Release 8.2).

Some AVPs are valid for all applications, (e.g.: Gx, Gxx, Rx). Other AVPs could be restricted to a subset of applications. Therefore, there is a wide diversity of which commands are mandatory to support for each 3GPP major and minor release and for each application. Therefore, to maintain maximum functionality, a PCRF node should be compatible with this diversity of Diameter command/Diameter AVP support when communicating with other 3GPP nodes and applications.

Advantageously, embodiments of this solution address incompatibility problems that may arise between telecom equipment that are running different versions of the Diameter protocol.

Figure 1:
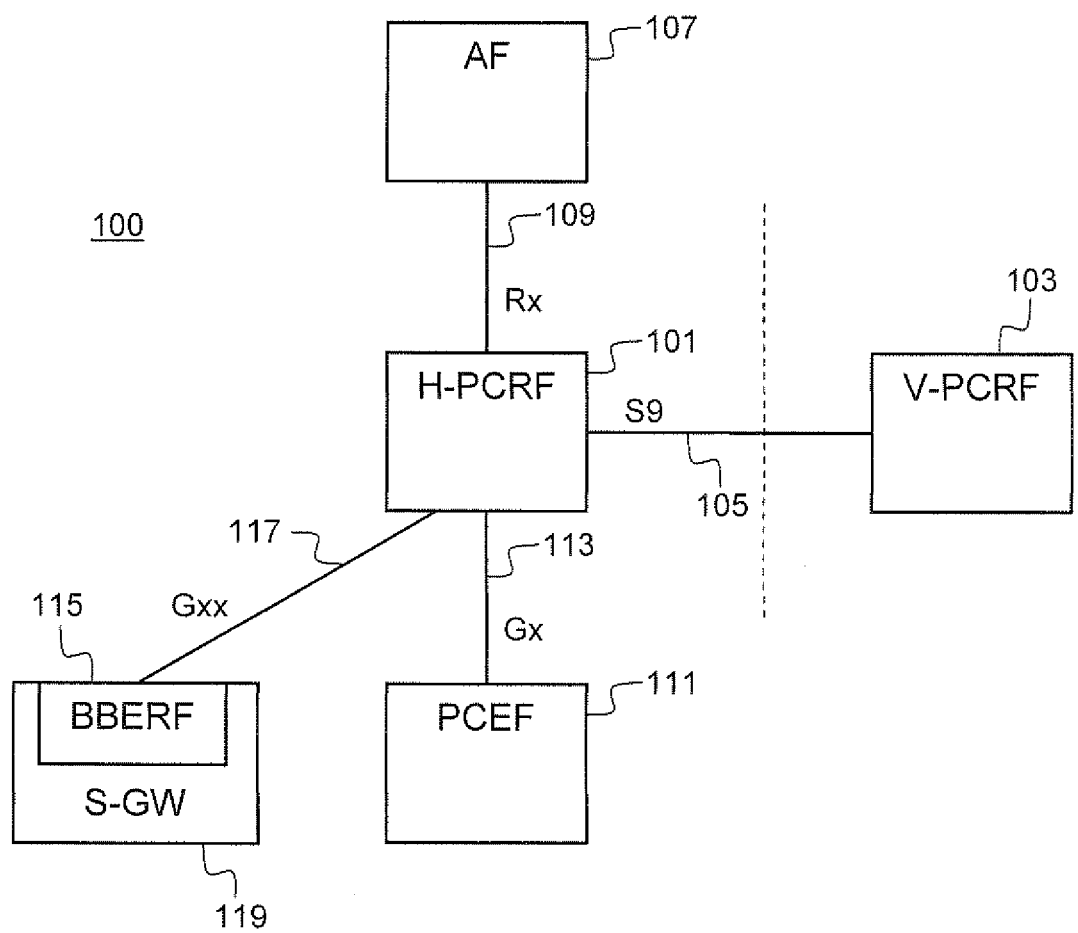
FIG. 1 illustrates a simplified block diagram of nodes of a 3GPP network.

FIG. 1 illustrates various elements of a 3rd Generation Partnership Project (3GPP) network 100. Policy and Charging Rule Function (PCRF) nodes 101, 103 can be a Home-PCRF 101 or a Visiting-PCRF 103 and communicate between themselves via the 3GPP-standard-defined S9 interface 105. PCRF 101 communicates with Application Function (AF) node 107 via the 3GPP-standard-defined Rx interface 109. PCRF 101 communicates with a Policy and Charging Enforcement Function (PCEF) node 111 via 3GPP-standard-defined Gx interface 113. PCRF 101 communicates with a Bearer Binding and Event Reporting Function (BBERF) node 115 via 3GPP-standard-defined Gxx interface 117. The BBERF 115 functionality can be implemented as a part of a Serving Gateway (S-GW) 119. The S9, Rx, Gx and Gxx interfaces are defined by 3GPP Technical Specifications (TS) 29.215, 29.214, 29.212, and 29.212 standards respectively. For Diameter messaging, the interfaces S9, Rx, Gx and Gxx are referred to as applications. Commands and AVPs can have definitions specific to a particular application even for the same 3GPP Version or Release.

Diameter protocol communications sessions are established by sending a session request message to the PCRF 101. For example, a PCEF would use a Gx Credit Control Request (CCR) message; a BBERF would use a Gxx CCR message; an AF node would use an Rx AA-Request (AAR) message. A PCRF peer would use an S9 CCR message. These session request messages include a Supported-Features Attribute Value Pair (AVP) to inform the receiving node about the required and optional features that the initiating node supports.

PCRF nodes typically need to interact with multiple nodes in the network, many of which could be from various vendors, thus it is advantageous if the PCRF node is flexible in terms of being able to interwork with different versions and different implementations of the 3GPP standards. The following description focuses on a PCRF node although embodiments of this invention can apply to other 3GPP nodes as well.

Embodiments of the present invention operate in conjunction with a Diameter versioning dictionary which is a Diameter Command Dictionary that supports multiple versions of the 3GPP protocol and hence multiple variations of Diameter commands.

FIG. 2 illustrates a conceptual representation of a data structure for a Diameter versioning dictionary 200. The dictionary contains entries for Diameter commands 201 and AVPs 203 with corresponding definitions 204, 205. Each command and AVP has a corresponding default definition 206 which defines the command or AVP for all versions of the 3GPP standard if no context exception applies. Thus, context-specific definitions are optional so that for example "AVP 2" 213 has only a single definition "Default Definition A2" that applies for all releases of the 3GPP standard and similarly, "Command 1" 214 has a single definition "Default Definition C1".

In addition, the Diameter versioning dictionary 200 can accommodate exceptions to the default definitions by defining one or more context-specific definitions 207 for each AVP or command. Each context-specific definition (e.g: "Definition A1-1" 211) is indexed by a context (e.g.: "Context 1" 209). A context identifies a specific condition to be met for the corresponding context-specific definition to apply. A context can comprise a specific 3GPP standard such as a major release (e.g.: Release 10) or a specific version of a major release such as a minor release (e.g: Release 10.4). A minor release could also be referenced by a release date (e.g: MARCH_2009). A context can also comprise a custom or proprietary implementation of a 3GPP standard from a specific vendor, identified by a custom label or identifier.

Note that a single context can act as a key for multiple definitions, thus for example with reference to FIG. 2, "Context 1" could represent "Release 8.4" and define "AVP 1" 215 as "Definition A1-1" 211 and define "AVP 3" 217 as "Definition A3-1" 219 and define "Command 2" 221 as "Definition C2-1" 223. "Context 2" could represent "Release 9.2" and define "AVP 3" 217 as "Definition A3-2" 225. In this way, multiple versions of a 3GPP standard can be accommodated by a single, flexible Diameter versioning dictionary.

The Diameter versioning dictionary interoperates with the Diameter protocol stack on the PCRF node. When the PCRF node needs to perform a "dictionary function" or "dictionary lookup" on or for a Diameter message, the PCRF first selects the 3GPP version required to communicate with the peer node, or required for the specific Diameter session as appropriate. The PCRF either knows the version that the peer node is running or the Diameter message indicates the version (in the Supported-Features AVP). The PCRF can check the version to find the proper definition of the command (e.g: AVPs, optional/mandatory). This selected 3GPP version is then used as a context during command look-up in the dictionary to access information about the given version of the command corresponding to the context or version. Definition attributes for commands can include whether it is optional or mandatory that the command itself is supported and can include AVPs and whether each AVP is optional or mandatory.

Examples of dictionary functions performed by a PCRF node that require correct version control of Diameter messages include: inquiries about commands (e.g.: syntax); validation of commands (e.g.: received from other nodes); formatting/building Diameter messages to send to other nodes; and translating Diameter messages between two versions when a PCRF is an intermediary between two nodes running at different versions (e.g.: a GW node running at 3GPP Release 7.1 and an Application Function (AF) node running at 3GPP Release 8.1.)

Conceptually the Diameter versioning dictionary contains every command for all supported versions (releases) of the 3GPP protocol. Note that not all commands are supported in each version. For example, a newer version may introduce new commands and possibly not support older commands. Each command will have one or more entries for the AVPs that it supports for a given version and whether or not the command and/or any of the AVPs are mandatory or optional for that version.

The Diameter versioning dictionary can be implemented as an Extensible Markup Language (XML) file. The following listing segment illustrates examples of Diameter versioning dictionary entries for a RAT-Type (Radio Access Technology). In this example, the definition applies if the version of the session is less than or equal to major-minor version Release 8/MARCH_2009. This is achieved by having no <startVersion> delimiter, but an <endVersion> delimiter of Release 8/MARCH_2009. There are 2 major versions described, one per applicable application. Since this is an AVP that is used for both "Gx" and "Rx", there is a major version defined for each. The rest of the major version is defined as a Supported-Feature consisting of vendor-Id, feature-list-id and feature-list. This is modeled after the Supported-Features AVP which is used in the 3GPP standard to model major versions.

```
<attribute code="1032"
        vendorName="3GPP"
        name="RAT-Type"
        format="ENUMERATED"
        mFlag="FORBIDDEN"
        pFlag="OPTIONAL"
        vFlag="REQUIRED"
        encrypt="true"
        register="true"
        proprietary="false"
<attribute code="1032"
        vendorName="3GPP"
        name="RAT-Type"
        format="ENUMERATED"
        mFlag="REQUIRED"
        pFlag="OPTIONAL"
        vFlag="REQUIRED"
        encrypt="true"
        register="true"
        proprietary="false"
        <versionContext>
         <tns:versionSpan>
          <tns:endVersion>
           <!-- MBit Set to REQUIRED till Rel8 : March-2009 -->
           <tns:majorVersion application="Gx">
            <tns:supportedFeatures vendorId="3GPP" featureListId="1"
                featureList="1"/>
           </tns:majorVersion>
           <tns:majorVersion application="Rx">
            <tns:supportedFeatures vendorId="3GPP" featureListId="1"
                featureList="1"/>
           </tns:majorVersion>
           <tns:majorVersion application="Gxx">
            <tns:supportedFeatures vendorId="3GPP" featureListId="1"
                featureList="0"/>
           </tns:majorVersion>
           <tns:minorVersion> MARCH_2009 </tns:minorVersion>
          </tns:endVersion>
         </tns:versionSpan>
        </versionContext>
</attribute>
```

The above example listing segment illustrates an example of a context-specific entry in a Diameter versioning dictionary for an AVP where a version span is defined "REQUIRED till Rel8: March-2009". Context-specific entries for Diameter commands can be similarly defined in a Diameter versioning dictionary as would be apparent to persons skilled in the art.

More specifically, the concept of a version span correlates to how a feature support requirement relates to a 3GPP major/minor version. A version span is a version that is delimited by a start and/or end delimiter. The start and end delimiters can be defined as a minor release (or minor version) and be characterized by a date, for example "MARCH_2009" or by a "Dot Release", for example "Release 8.3" which would indicate minor release "0.3" of major release "Release 8". Both the start and end are optional so there are four possible permutations of a span.

By default, a Diameter command/AVP is unbounded, which means any associated feature would apply all the time. Thus there is no start delimiter and no end delimiter. (Alternatively, the start delimiter and end delimiter can be characterized as: <null>:<null>).

A Diameter command/AVP could have only a start bound but no end bound, in which case the corresponding feature is to be supported from the start delimiter (the specific minor release) onward. This would typically relate to a feature that is being introduced. This can be useful when a new feature is introduced in a new major release and it is desired to also "back-port" it to a new minor release of a previous major release. In this case, the start delimiter and end delimiter could be characterized as: <some start version>:<null>.

A Diameter command/AVP could have an end bound but no start bound, in which case support of the corresponding feature will end at a given time or a specific minor release, as defined by the end bound. This would typically relate to a feature that is being phased out. In this case, the start delimiter and end delimiter could be characterized as: <null>:<some end version>.

A Diameter command/AVP could have both a start bound and an end bound. This would typically relate to a temporary feature that would be implemented for a specific period of time. In this case, the start delimiter and end delimiter could be characterized as: <some start version>:<some end version>.

The following pseudo-code illustrates an embodiment for determining whether an attribute definition (feature) is applicable to the current message/session's version:

```
Get the spans for the attribute definition for the given application
    if (no spans)
        //attribute definition is unbounded and therefore, applicable
        Attribute definition is applicable, exit this algorithm
    else
        if (one of the spans is for the same major version as the current
message/session's major version)
        {
            If (current minor version falls within the same span's start and
end delimited minor versions)
                // the absence of a starting delimiter implies "since
inception" and
                // the absence of an ending delimiter implies "indefinitely".
                Attribute definition is applicable, exit this algorithm
```

-continued

```
    }
    else
    {
        // make sure there is no older span with an ending delimiter or
        // a newer span with a starting delimiter.
        for (each of the version spans)
        {
            if (this span's major version is less than the current/given major version)
            {
                if (this span has an end delimiter)
                {
                    //version span pre-dates current version
                    Attribute definition is not applicable, exit this
                    algorithm
                }
            }
            // span greater/newer than current major version
            else
            {
                if (this span has a start version)
                {
                    // current version pre-dates version span.
                    Attribute definition is not applicable, exit this
                    algorithm
                }
            }
        }
    }
    // fall through "if" statements above
    Attribute definition is applicable, exit this algorithm
}
```

Figure 3:
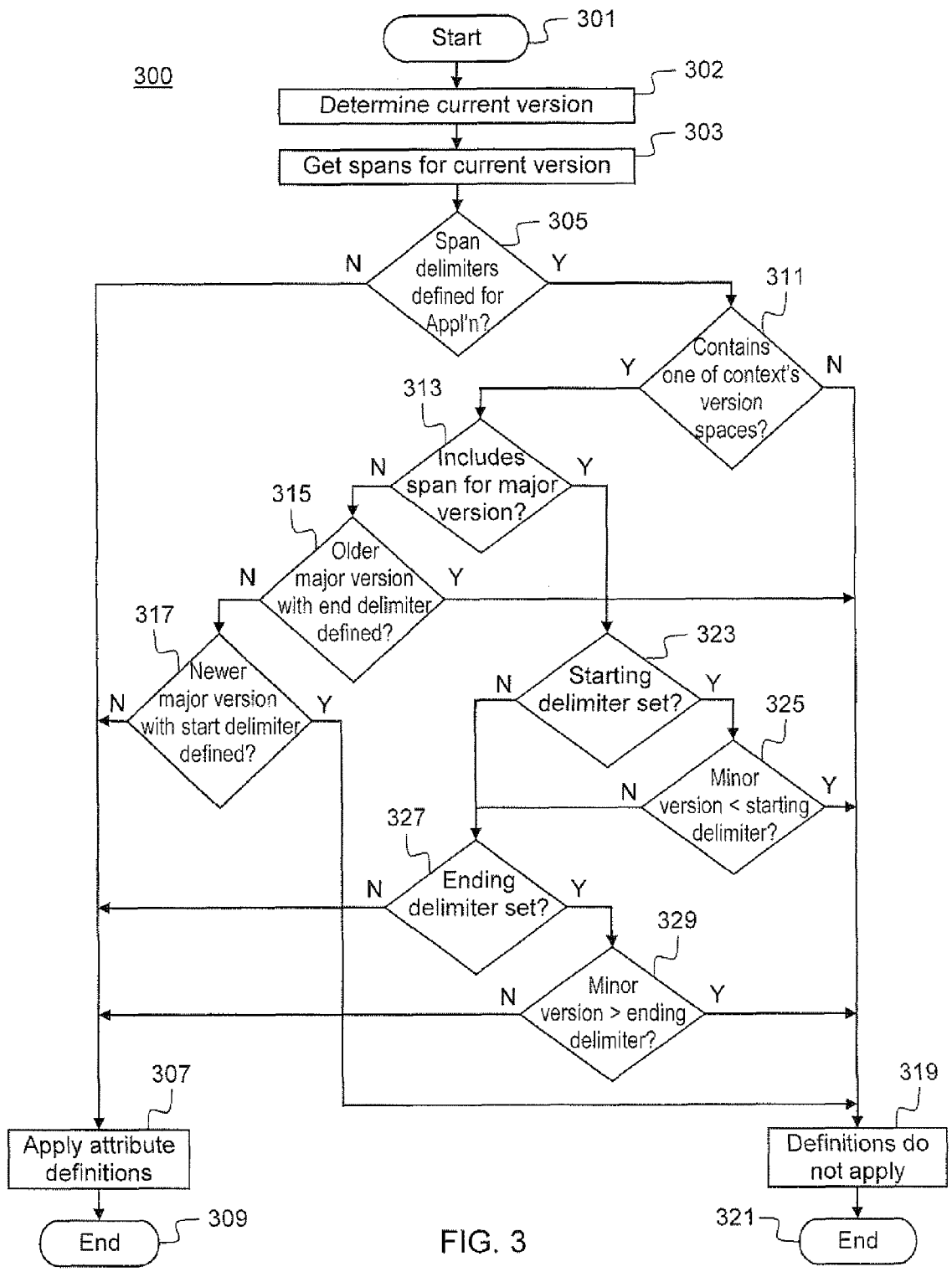
FIG. 3 illustrates a flow chart according to an embodiment of the invention.

Another embodiment is described in FIG. 3 which illustrates a flow chart for a process for evaluating version spans of a Diameter AVP or Diameter command at a network node. The process starts at step 301. At step 302 the network node determines the current version of an incoming Diameter session Establish message (e.g.: Gx CCR, Gxx CCR, Rx AAR). The network node retrieves the current major release from the Supported Features AVP within the Establish message. The 3GPP protocol currently does not provide a mechanism for communicating a minor release or other variation of a major release. An operator of the network node can provision or configure a minor release and other details for each Diameter identity (corresponding to peer nodes connected the network node via the various interfaces (e.g.: Gx, Gxx, Rx)). Peer nodes are sometimes referred to as gateways. The network node therefore retrieves the minor release from the provisioned information stored at the network node for the applicable Diameter identity. Embodiments of the present invention contemplate various methods to determine the current version including retrieving both the major version and minor version from provisioned information or other mechanisms that would be apparent to persons of skill in the art.

At step 303, the network node retrieves the spans defined in the versioning dictionary for the current version (major release-minor release) for the given application. At step 305, the network node determines if span delimiters are defined for the application (e.g.: Gx, Gxx, Rx). If not this means that the attribute definition is unbounded and the process continues to step 307 where the network node applies the attribute definitions and the process stops at step 309. If at step 305 the network node determines that span delimiters are defined, this means that there is a time span constraint on the definition for that particular application and the process proceeds to step 311 where the network node determines if the current version contains one of the version spaces defined in the Diameter versioning dictionary for the version context (definition). In other words, if the current version contains one of this AVP's definition's version spaces. Note that the AVP definition could include spans for different version spaces. A version space is defined by a vendor ID. For example, a 3GPP version space (vendorName="3GPP") may have a specific version span for a specific major-minor version for an application and a proprietary version space may define a different version span for the same major-minor version for the same application. If the current version does not contain one of the version spaces there is no match, and the process proceeds to step 319 where none of the application definitions match and the process ends at step 321. If at step 311 it is determined that the current version contains one of the version spaces then the process proceeds to step 313.

At step 313, the network node determines if the definition (context) includes a span for the current major version. If so, this means the definition for the current major version has time or minor version constraints and the process continues to steps 323 through to 329 to determine if any of these constraints apply. At step 323, the network node determines if starting delimiter for the minor version is set and if so at step 325, the network node determines if the current minor version is less than the defined starting delimiter. In other words, if the current minor version is outside the bounds of the span. If so, then the definitions do not apply and the process continues to step 319. If at step 323 the starting delimiter is not set or at step 325, the current minor version is within the bounds of the starting delimiter then the process continues to step 327.

At step 327, the network node determines if ending delimiter for the minor version is set and if so at step 329, the network node determines if the current minor version is greater than the defined ending delimiter. In other words, if the current minor version is outside the bounds of the span. If so, then the definitions do not apply and the process continues to step 319. If at step 327 the ending delimiter is not set or at step 329, the current minor version is within the bounds of the ending delimiter, this means that the current version is within the bounds of the constrained definition of the minor version and that the attribute definitions of the constrained major-minor version applies and the process continues to step 307.

If at step 313 the network node determines that the definition (context) does not include a span for the current major version, then the process proceeds to step 315 to determine if there is an older version or a newer version of a feature definition (attribute definition) that can be applied. Thus at step 315, the network node determines if an older major version exists with an end delimiter defined and if so the version span predates the current version and the feature is no longer defined and therefore the definitions do not apply and the process proceeds to step 319.

Otherwise, if at step 315 the network node determines that there is no older major version with an end delimiter defined then the process proceeds to step 317 where the network node determines if a newer major version exists with a start delimiter defined and if so, the feature is not yet defined for the current version and the definitions do not apply and the process proceeds to step 319.

If at step 317 the network node determines that there is no newer major version with a start delimiter defined then the feature definitions for this older or newer version are not bounded and do apply and the process proceeds to step 307.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Numerous modifications, variations and adaptations may be made to the embodiment of the invention described above without departing from the scope of the invention, which is defined in the claims.

What is claimed is:

1. A method of managing version spans for a communication protocol, performed by a network node, the method comprising steps of:
    determining identification of a current version of a Diameter communication protocol associated with a communication session including determining a major version and a minor version including accessing provisioned information on said network node associated with a Diameter identity associated with said session;
    retrieving version spans for said current version from a protocol versioning dictionary at said network node; and
    determining if an attribute definition exists having a version span matching said current version and if so, determining if said current version satisfies time constraints of said version span and if so applying the associated attribute definition.

2. The method of claim 1, wherein if no attribute definition exists having a version span matching said current version, then determining if an older version applies and if so applying the associated attribute definition.

3. The method of claim 2, wherein determining if an older version applies comprises applying the associated attribute definition only if the version span for said older version has no end delimiter.

4. The method of claim 1, wherein if no attribute definition exists having a version span matching said current version, then determining if a newer version applies and if so applying the associated attribute definition.

5. The method of claim 4, wherein determining if a newer version applies comprises applying the associated attribute definition only if the version span for said newer version has no start delimiter.

6. A network node configured to manage version spans for a communication protocol, said network node comprising:
    an interface for communicating with an entity operable to send and receive messages regarding a session;
    data storage adapted to store session data related to the session and to store configuration data corresponding to the entity; and
    a controller operable to:
    determine identification of a current version of a Diameter communication protocol associated with a communication session including determining a major version and a minor version including accessing provisioned information on said network node associated with a Diameter identity associated with said session;
    retrieve version spans for said current version from a protocol versioning dictionary at said network node; and
    determine if an attribute definition exists having a version span matching said current version and if so, determining if said current version satisfies time constraints of said version span and if so applying the associated attribute definition.

7. The network node of claim 6, wherein said controller is further operable so that if no attribute definition exists having a version span matching said current version, then determining if an older version applies and if so applying the associated attribute definition.

8. The network node of claim 7, wherein said controller is further operable so that determining if an older version applies comprises applying the associated attribute definition only if the version span for said older version has no end delimiter.

9. The network node of claim 6, wherein said controller is further operable so that if no attribute definition exists having a version span matching said current version, then determining if a newer version applies and if so applying the associated attribute definition.

10. The network node of claim 9, wherein said controller is further operable so that determining if a newer version applies comprises applying the associated attribute definition only if the version span for said newer version has no start delimiter.

11. A tangible and non-transitory machine-readable storage medium encoded with instructions for execution by a network node, the tangible and non-transitory machine-readable storage medium comprising:
    instructions for determining identification of a current version of a Diameter communication protocol associated with a communication session including determining a major version and a minor version including accessing provisioned information on said network node associated with a Diameter identity associated with said session;
    instructions for retrieving version spans for said current version from a protocol versioning dictionary at said network node;
    instructions for determining if an attribute definition exists having a version span matching said current version and if so, determining if said current version satisfies time constraints of said version span and if so applying the associated attribute definition.

12. The tangible and non-transitory machine-readable storage medium of claim 11, comprising instructions so that if no attribute definition exists having a version span matching said current version, then determining if an older version applies and if so applying the associated attribute definition.

13. The tangible and non-transitory machine-readable storage medium of claim 12, wherein instructions for determining if an older version applies comprises applying the associated attribute definition only if the version span for said older version has no end delimiter.

14. The tangible and non-transitory machine-readable storage medium of claim 11, comprising instructions so that if no attribute definition exists having a version span matching said current version, then determining if a newer version applies and if so applying the associated attribute definition.

15. The tangible and non-transitory machine-readable storage medium of claim 14, wherein instructions for determining if a newer version applies comprises applying the associated attribute definition only if the version span for said newer version has no start delimiter.

* * * * *